United States Patent [19]

Stoll et al.

[11] Patent Number: 4,544,130
[45] Date of Patent: Oct. 1, 1985

[54] CHOKE UNIT

[76] Inventors: Kurt Stoll, Lenzhalde 72, D-7300 Esslingen, Fed. Rep. of Germany; Hans-Heinrich Glättli, Seestrasse 252, CH-8700 Küsnacht/Schweiz, Switzerland

[21] Appl. No.: 637,849

[22] Filed: Aug. 6, 1984

[30] Foreign Application Priority Data

Aug. 24, 1983 [DE] Fed. Rep. of Germany ... 8324276[U]

[51] Int. Cl.⁴ ............................................. F16K 47/06
[52] U.S. Cl. ..................................... 251/208; 251/176
[58] Field of Search ............... 251/121, 208, 205, 209, 251/118, 176; 137/513.3, 513.7, 599; 239/542, 547; 138/42, 43

[56] References Cited

U.S. PATENT DOCUMENTS

| | | | |
|---|---|---|---|
| 1,315,741 | 9/1919 | Pranold | 251/205 |
| 2,572,950 | 10/1951 | Rider | 251/208 |
| 4,205,822 | 6/1980 | Bernat | 251/208 |
| 4,380,250 | 4/1983 | Stoll | 251/208 |

Primary Examiner—Samuel Scott
Assistant Examiner—Noah Kamen
Attorney, Agent, or Firm—McGlew and Tuttle

[57] ABSTRACT

The essential part of an adjustable choke for compressed air and other fluids is made up of two relatively turning disks of which one has a calibrated channel in it running round the axis of the disks. By relative turning of the disks the fluid is caused to flow along different lengths of the channel in keeping with the desired choking action. The two disks are mounted within a housing, with a spring keeping them pressed together. The housing has a bell-like cover in which one of the disks is keyed and sealed at the disk's outer edge with the spring between it and the top of the cover in a chamber. The other disk is mounted on a base of the housing. There is a central pillar in the housing that joins the cover to the base and contains a duct by which is supplied into the chamber through a hole in the one disk, into the channel, through the other disk and then out through the base of the housing. The cover may be turned for turning the one disk in relation to the other.

23 Claims, 4 Drawing Figures

CHOKE UNIT

BACKGROUND OF THE INVENTION

The present invention relates to choke units or devices and more specially to such units of the sort comprising a housing made up of a housing base and housing cover, an inlet duct and an outlet port, a controlling device having a setting disk and able to be turned from the outside, said disk having a through hole joined with the inlet duct and being able to be turned in relation to a contact disk on which it rests fluid-tightly, the contact disk having a hole joining on the one hand, a channel formed between the setting and contact disks and by way of the channel the hole in the setting disk, and on the other hand the outlet port, the channel running round the common axis of turning of the setting and the contact disk for less than one turn and having a cross section that changes along the circumferential extent of the channel, there being a pillar fitting fluid-tightly in one of the disks.

Known choke units of this sort are constructed with a pillar having a rotary disk and protruding through the cover of the housing. This pillar is then used for the adjustment. The inlet duct and the outlet port for the fluid are formed in the housing base in such a way that one of the two runs axially in relation to the pillar, whereas the other, normally the inlet duct, opens from the side into an inlet chamber in the housing. The resulting construction is such that the outlet port of the inlet duct formed in the base of the housing is placed at some distance clear of the outlet port that is formed in the base as well. A decrease in the distance between the two ports so making it possible for the ducts to be joined with the housing as centrally as possible thereon would call for a sturdier design of the housing, because for example the inlet duct would not only take up space in the lower part of the base but would also run out to the side. In many a case it is imperative to be able to accommodate the very maximum number of choke units in the smallest possible space, but this is hardly feasible with known choke units, more specially because of their lack of robustness and the central location of the ducts for the fluid. In the case of one unit designed to be able to supply several such chokes with fluid under pressure, there is in addition the danger of the ducts being confused and wrongly connected. The replacement of a number of choke units mounted in the form of a single block is also complex because of the unsystematic arrangement of the ducts or leads.

SHORT OVERVIEW OF THE PRESENT INVENTION

Taking this prior art as a starting point one purpose of the present invention is to design a choke unit of the sort noted which is small in size and compact.

A further aim of the invention is to design a compact unit such that the external ducts for the fluid under pressure may be more of less centrally joined up with the unit.

With a view to effecting these and other objects in the invention a choke unit of the sort in question is so constructed that the inlet duct is formed in the pillar and the setting disk fits fluid-tightly in a radial direction both against the pillar and against the cover, which is joined to the setting disk so that it may not be turned thereon.

In the choke unit of the invention the cover of the housing is a part of the controlling means and the connections or terminals for the supply inlet and outlet ducts may readily be placed with only a small clearance therebetween. The fact that the ducts for the fluid under pressure only run through the base makes it possible for the dimensions of the housing to be cut down a great deal not only axially but also radially. The further inlet port for the inlet duct does not however entail any weakening of the structure of the base of the housing, because it is formed in the pillar, that will normally be made of metal. Because the point of connection between the base and the ducts may readily be seen and inspected it is possible for a large number of choke units to be accommodated in a small space. Last but not least it is to be stressed that the choke unit in keeping with the present invention may be more efficiently operated because the adjustment of the controlling means is done directly through the cover of the housing.

Further useful features of the invention will be seen from the claims.

In keeping with one expedient feature of the invention the inlet duct runs through the pillar axially, the parts thereof at the ends of the inlet duct in the form of a hole in the pillar being screw threaded. The design may be such that the threads have the same size and form and in this way the variability of the choke unit is improved, because the choke unit may be put at some position along the duct leading from the source of fluid under pressure to the load. In this respect one axial end of the pillar will be sealed off pressure-tightly. In order to seal off one axial end of the pillar and to join the other with an external duct, it is possible, in keeping with another feature of the invention, for the screw threads to be in inserts that are locked on the pillar so that they are not able to be turned, there being axially running sealing inserts between the shaft and the threaded inserts. The connection between the choke unit and external ducts may also be undertaken by having a male inlet pipe fitting for connection with a fluid pipe and by having an oulet male pipe fitting screwing into the outlet port.

If the cover is made in the form of a cup that is placed partly round the base then the unit and more specially the setting of the controlling means is greatly improved, inasfar as the user is able to get at the main part of the housing, so that even if the choke unit is made with a very small size operation is better than is the case with prior art choke units.

The internal structure of the controlling means may be further improved by having a chamber between the setting disk and the cover for a spring that presses the setting disk against the contact disk. In this way one may be certain of having a pressure-tight connection between the contact and sealing disks, whose adjacent faces are normally flat. However it is still possible for the adjacent faces to have a different form, as for example part-spherical; it is only necessary to make certain that they function in such a way that when the controlling means is turned, that is to say adjusted, there is a change in the flow cross section.

In keeping with a still further expedient feature of the invention the pillar is fixedly joined to the base, whereas the cover is able to be turned on the pillar, with a joint therebetween that is gas-tight and keeps the cover from moving axially. This feature makes it possible for the choke unit to be assembled without any extra screws or other fastening means. The unit may furthermore be made more compact if the base tapers inwards into the housing and the hollow inside the cover flares outwards towards the base so that the outline of the cover merges steplessly with the outline of the base. In this respect the arrangement may be such that the base tapers in steps and the cover widens in steps in a complementary manner thereto. This measure furthermore has the effect of keeping dirt out of the housing.

In order to be able to join the choke unit with other components, in keeping with a further expedient part of the invention, the bottom of the base has threaded holes therein to take up screws running through a base plate. In this way the choke unit may readily be joined to an instrument panel. The connection may be still further improved by having concentric holes, and a middle hole in the base through which the inlet male pipe fitting may be run which is screwed to the pillar.

To get a gas-tight connection of the pillar with the base and the setting disk, and with the cover, it is possible to have grooves with sealing rings lodged in them running in the circumferential direction of the pillar, i.e. round it.

Because apart from the pillar the main parts of the housing may be made of synthetic resin, the join between the pillar and the base, that may be injection molded, is very simple to produce.

It will be clear that the choke in keeping with the invention is specially suited to being fitted on instrument panels, although it may furthermore be mounted in enclosures adapted for fluid circuitry and accessories. The choke may be used for very accurately choking the flow not only of gases but also of liquids.

An account will now be given of one working example of the invention using the figures.

LIST OF THE DIFFERENT VIEWS OF THE DRAWINGS

DETAILED ACCOUNT OF WORKING EXAMPLE OF THE INVENTION

Figure 1:
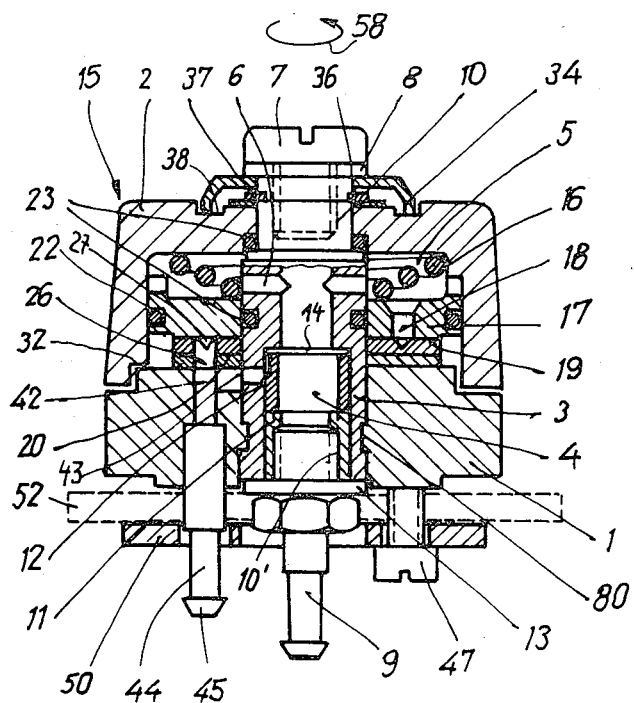
FIG. 1 is a lengthways section through the choke unit of the present invention.

The choke unit or device is made up of two housing parts 1 and 2, the part 1 being designed as a base whereas the part 2 of the housing is in the form of a cover. The base 1 is joined to the cover 2 by way of a pillar 3 or shank, that is placed centrally with respect to the rest of the housing and runs through it axially. The pillar 3 is joined to the base 1 by way of a feather and groove construction so that it may not be turned in relation thereto and is furthermore joined with the cover 2 sealingly and so that the cover may be turned thereon. Within the axially alined pillar 3 an inlet duct 4 is formed, that opens by way of holes 6 into an inlet chamber 5. The top axial end of the inlet duct 4 or hole 6 is in the case of the present working example of the invention sealed off gas-tightly by a screw 7 and a seal 8. For this purpose pillar 3 has thread 10 at its top, for screw 7. The inlet port of the inlet duct 4, that is to be seen at the bottom in FIG. 1, is fitted with an inlet male pipe fitting 9 screwed into it. The threads formed at the axial ends of the inlet duct have the same thread form and diameter so that the fitting 9 and the screw 7 may be changed around. The thread 10' for fitting 9 is is not formed directly in the material of the pillar 3 itself but in an insert 11, there being sealing inserts 12 between the threaded insert 11 and the pillar 3. The sealing insert 12, mounted on the threaded insert 11 of the male inlet fitting 9, is so designed that there is a ring-like clearance 14 between it and the part of the pillar bore with a smaller diameter running in the axial direction. The sealing insert 12 is made of a soft rubber or rubber-like material, that makes sealing contact with the bore of the duct 4 when the inlet duct is put under pressure. Because there is a hole 43 in the base 1 and in the part of the pillar 3 near the sealing insert 12 to join the inlet duct 4 with an outlet port 42, the sealing insert may function as a check valve bypassing the choke, this speeding up the release of fluid from the load inasmuch as there are then two passageways for such spent fluid from the load.

Between the inlet male pipe fitting 9 and the pillar 3 there is a further seal or gasket washer 13. This makes it possible for the fluid under pressure supplied at 9 to go into the inlet chamber 5 by way of the inlet duct 4 and the hole 6. In the inlet chamber there is a controlling means that is generally referenced 15 and is made up of a spring 16, a setting disk 17 with a hole 18, a contact disk 19 and a cover disk 20. The cover 2 of the housing whose fluid-tight joint on the pillar 3 allows it to be turned thereon, is joined to the setting disk 17 by way of seal 22 so it that may not be turned in relation thereto. The setting disk 17 is for its part pressure-tightly joined to the pillar so that it may be turned thereon, because of the design of the seal 23 between it and the pillar 3. The contact disk 19 is joined with the base 1 of the housing indirectly by way of the cover disk 20, that has a hole 26 lined up with the hole 25 in the contact disk. Between the setting disk 17 and the cover disk 20 there is a calibrated channel 27, which in the present working example, as will clearly be seen from FIG. 3, is formed in the contact disk 19.

Figure 3:
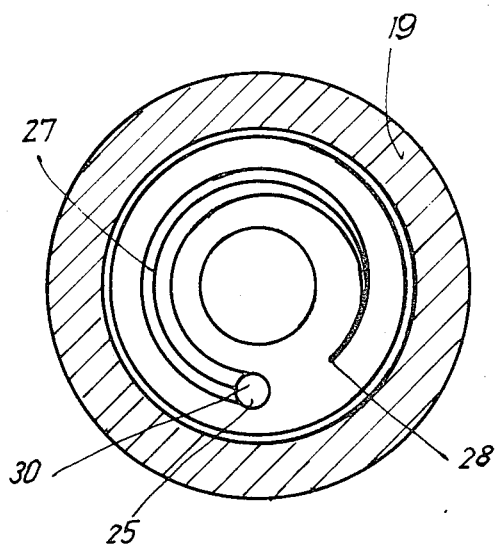
FIG. 3 is a view looking vertically downwards onto the cover disk of the unit.

As will furthermore be seen quite clearly from FIG. 3, the channel 27 is joined at one end with the hole 25. The channel 27 has the form of a covered groove or a triangle in cross section, the depth and the breadth (that is to say the side of the triangle formed by the contact disk 19) decreasing circumferentially from the hole 26 at the one end, towards the other end 28 of the channel 27. The bottom of the cross section of the channel 27 follows a generally helical path in the circumferential direction. The length of the channel 27 is such that, as may be seen from FIG. 3, the maximum cross section of the channel is at the point 30 and the minimum value is at the end 28 which are so spaced that the cover 2 has to be turned through about ¾ of a full turn to change over the choke unit from the minimum setting to the maximum one. If the cover is turned somewhat past the minimum setting, the flow will be shut off completely. The end of the turning motion is set by a head 32 on the base 1.

Because the cover 2 is rested against a step 33 on the pillar 3, and on the outside the cover is held in place by a bell-like retainer washer 34 that is fixed in place on the pillar, the cover 2 may not be moved axially. Under the retainer washer 34 there is a further washer 36 and a circlip 37 to keep the washer 34 on the screw 7. There is a scale on the top face of the cover 2 running circumferentially around it so that it is possible to read a value for the setting of the choke unit using a pointer marked on the washer 34. Because the outer edge of the retainer washer 34 is taken up in a groove 38 in the cover 2, there is no chance of dirt collecting around the circlip 37. As will further be seen from FIG. 1, the cover 2 is in the form of a bell or cup and its lower skirt part is placed around the top part of the base 1. Because the base 1 is stepped and becomes narrower so as to fit into the inside of the cover 2, which has a corresponding step making it wider at this position, the housing is generally cylindrical rather than conical.

Figure 2:
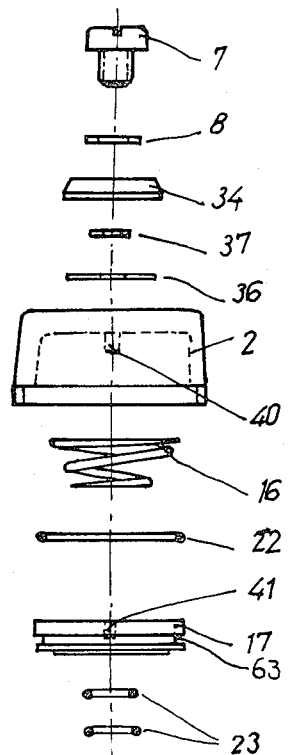
FIG. 2 is an exploded view of the unit of the invention.

The means for keying the cover 2 to the setting disk 17, so that relative rotation thereof is checked, is further improved by a pin and groove connection as will be seen from FIG. 2. A pin 40 on the cover 2 fits into a groove 41 in the setting disk 17 when the choke unit is assembled. The setting disk 17 makes good contact with the contact disk 19, not only because the setting disk 17 and the contact disk 19 are both flat but furthermore because of the force of the compression spring 16. The cover disk 20 is made of rubber or rubber-like material so that there is a gas-tight joint between it and the contact disk 19. The hole 26 in the cover disk 20 is in line with the outlet port 42 that is formed in the base 1. An outlet male pipe fitting 44 may be screwed into place parallel to the inlet fitting 9 in the outlet port 42 from the same side of the housing, the other end of the fitting 44 having a head 45 formed thereon. In this way the unit may readily be joined up with other components. The inlet male pipe fitting 9 has a similar head.

Figure 4:
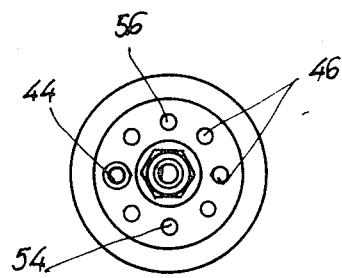
FIG. 4 is view looking at the base as seen from below in the direction of the arrow IV as marked in FIG. 3.

In the bottom of the base 1 there are a number of threaded holes 46 (see FIG. 4) to take up screws 47. Together with a base plate 50 these screws function to keep the unit in place when it is to be mounted on an instrument panel 52 for example. There are further holes 54 and 56 in the bottom of the base 1 into which further outlet male pipe fittings may be inserted if desired. In the present working example the holes 54 and 56 are plugged gas tightly, although this is not marked in the figures.

Because the thread of the inlet fitting 9 and the thread of the screw 7 are of the same type and have the same diameter, the two parts are interchangeable and the choke unit may be put in circuit between a pressure fluid source and the load powered thereby.

ACCOUNT OF THE FUNCTION OF THE CHOKE UNIT

The male inlet pipe fitting 9 is joined up with a pipe from a source of pressure, whereas the outlet male pipe fitting 44 is connected with a pipe running to a load. The fluid under pressure supplied through fitting 9 goes through the inlet duct 4 and the radially running holes 6 into the inlet chamber 5 from which the fluid then runs by way of the hole 18 into the calibrated channel 25. When the hole 18 is in communication with the hole 25 in the contact disk 19, that is to say when the cover is turned round as far as it will go in the one direction, the choking effect is at a minimum. If now the housing part 2 is turned in the direction of the arrow 58 out of this minimum or initial position, the flow cross section will be decreased because the fluid will have to flow along some of the length of the channel 27. The cover may be turned into a second end position through an angle which, while being smaller that 360°, is greater than the angle subtended by the channel 26. In this second end position of the cover 2 the hole 18 of the setting disk 17 is on a part of the contact disk 19 past the end of the channel therein. In this position of the cover 2 and of the setting disk 17 the flow of fluid through the unit will be cut off.

It will be gathered that the settings of the unit of the present invention will give exactly the same, i.e. reproducible flow rates, as will hardly need any explanation.

It may be seen from FIG. 2 that the assembly of the choke unit is extremely simple because the base 1, that will normally be made of synthetic resin, may be joined to and keyed onto the pillar 3, so that the pillar is not able to be turned in relation thereto. The base 1 and the pillar 3 are then fitted with the cover disk 20, that is keyed to the base 1 by way of a pin 60, the contact disk 19 and the sealing rings 23, that are placed in the grooves 62. Then the setting disk 17 is joined to the pillar 3, the sealing ring 22 having previously been put in the groove 63 of the pillar. After the setting disk 17 has been placed on the contact disk 19, the spring 16 is put in place and it is then compressed by putting on the cover 2. In this respect care is necessary to see that the pin 40 fits into the groove 41. Lastly the sealing ring 36 and the circlip 37 are joined to the pillar, the circlip 37 snapping into the groove 66. After this the cover disk 35 is united with the pillar 3, for example by hot pressing. The screw 7 and the seal 8 are also joined to the pillar to make certain that there is no escape of fluid to the outside.

We claim:

1. A choke unit comprising a base and a cover, together forming a housing with a space therein and with an inlet duct and an outlet port, said duct and said port communicating with said housing space, flow rate controlling means joined fluidwise between said duct and said port, said controlling means being made up of a setting disk and of a contact disk, said disks making sealing contact with each over a contact interface, said disks being able to be turned in relation to each other about an axis while maintaining said contact interface, one of said disks having a groove therein within the area of said contact interface, said groove running circumferentially around said axis for less than 360° and increasing in cross section circumferentially, holes in at least one of said disks communicating with said groove for conducting fluid into and out of a given length of said groove which may be changed by relative rotation of said disks, said holes being joined with said inlet duct and with said outlet port, a pillar for sealingly supporting one of said disks, said inlet duct being within said pillar, said setting disk being joined with said cover so as to be turned thereby, and radially fitting against said cover and said pillar so as to make sealing contact with both of them.

2. The choke unit as claimed in claim 1 wherein the inlet duct is runs axially along and inside said pillar.

3. The choke unit as claimed in claim 2 wherein ends of said inlet duct in said pillar have screw threads.

4. The choke unit as claimed in claim 1 wherein said screw threads are of the same size and thread form.

5. The choke unit as claimed in claim 4 wherein one of said threads is formed in inserts mounted and keyed in said pillar.

6. The choke unit as claimed in claim 5 comprising a pipe-like sealing insert mounted between the pillar and said threaded insert mounted adjacent to said base so that there is ring-like gap between said pipe-like insert and a step inside the pillar at the end of the pipe-like insert facing away from said base.

7. The choke unit as claimed in claim 1 comprising a male inlet pipe fitting joined with the inlet duct and a male outlet pipe fitting screwed into the outlet port.

8. The choke unit as claimed in claim 1 wherein said cover is bell-like and surrounds part of the base.

9. The choke unit as claimed in claim 1 wherein an inlet chamber is formed between the setting disk and the cover, said unit further comprising a spring placed in the chamber for pressing the setting disk against the contact disk.

10. The choke unit as claimed in claim 1 comprising a sealing disk placed between the contact disk and the base.

11. The choke unit as claimed in claim 1 wherein said pillar is fixedly joined to said base.

12. The choke unit as claimed in claim 1 wherein said cover is gas-tightly fitted on said pillar, is locked axially in relation thereto and may be turned thereon.

13. The choke unit as claimed in claim 6 further comprising a bypass check valve in a passageway formed in the base and in the part of the pillar with the sealing insert, said passageway connecting the inlet duct with the outlet port.

14. The choke unit as claimed in claim 1 wherein said base tapers into an opening in said cover, said cover opening becoming wider towards said base so that there is a smooth or stepless transition between the outline of the cover and the outline of the base.

15. The choke unit as claimed in claim 14 wherein said base has a step fitting into a step inside said cover.

16. The choke unit as claimed in claim 1 wherein said base has axial threaded holes therein running from a side thereof facing away from said cover, said threaded holes being designed to take up screws for fixing said unit in place on a base plate.

17. The choke unit as claimed in claim 16 wherein said base has holes alined with a circle centered on the axis of said pillar, said pillar having an axial hole therein adapted to have a male pipe fitting screwed thereinto.

18. The choke unit as claimed in claim 1 wherein said pillar has circumferential grooves.

19. The choke unit as claimed in claim 18 wherein one of said grooves is formed at said base, said base having a feather fitting into said groove for locking said base onto said pillar in the manner of a feather joint.

20. The choke unit as claimed in claim 1 wherein said pillar extends both through said cover and through said base.

21. The choke unit as claimed in claim 1 wherein said shaft is placed centrally on said base and runs in the lengthways direction thereof.

22. The choke unit as claimed in claim 1 comprising a circlip and a seal joining said pillar and said cover together and a retainer washer covering over said seal and said circlip.

23. The choke unit as claimed in claim 7 wherein said male fittings run out from a single face of the unit and are parallel to each other.

* * * * *